United States Patent
Imamura et al.

(10) Patent No.: US 8,528,958 B2
(45) Date of Patent: Sep. 10, 2013

(54) VEHICLE SEAT ACCOMMODATING DEVICE

(75) Inventors: Masahiro Imamura, Utsunomiya (JP);
Osamu Shirose, Utsunomiya (JP);
Ichirou Yokoyama, Asaka (JP);
Tsuyoshi Sato, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/394,387

(22) PCT Filed: Sep. 6, 2010

(86) PCT No.: PCT/JP2010/065251
§ 371 (c)(1),
(2), (4) Date: Mar. 6, 2012

(87) PCT Pub. No.: WO2011/030734
PCT Pub. Date: Mar. 17, 2011

(65) Prior Publication Data
US 2012/0161461 A1    Jun. 28, 2012

(30) Foreign Application Priority Data

Sep. 9, 2009   (JP) ................................. 2009-208154
Sep. 9, 2009   (JP) ................................. 2009-208155

(51) Int. Cl.
*B60N 2/36*    (2006.01)
(52) U.S. Cl.
USPC ............ 296/65.09; 296/66; 297/15; 297/335
(58) Field of Classification Search
USPC ................. 296/65.05, 65.09, 66, 67; 297/15, 297/326, 332, 333, 335
See application file for complete search history.

(56) References Cited

U.S. PATENT DOCUMENTS 5,890,758 A * 4/1999 Pone et al. ...................... 297/15

FOREIGN PATENT DOCUMENTS

| JP | 62-150234 | 9/1987 |
| JP | 63-145729 UM | 9/1988 |
| JP | 6-234337 | 8/1994 |
| JP | 09-207637 | 8/1997 |
| JP | 2001-055067 | 2/2001 |
| JP | 2001-322465 | 11/2001 |
| JP | 2003-212017 | 7/2003 |
| JP | 2005-022484 | 1/2005 |
| JP | 2008-120334 | 5/2008 |

OTHER PUBLICATIONS

Japanese Office Action, Application No. 2009-208154, dated Jan. 29, 2013, 4 pages.

* cited by examiner

*Primary Examiner* — Dennis Pedder
*Assistant Examiner* — Beverly Becker
(74) *Attorney, Agent, or Firm* — Rankin, Hill & Clark LLP

(57) ABSTRACT

A vehicle seat accommodating device of the invention includes: a seat configured to include a seat cushion and a seat back supported so as to be tiltable with respect to the seat cushion; an accommodation recess portion formed on a floor located behind the seat; and a support unit movably supporting the seat so as to accommodate the seat in the accommodation recess portion in a state where the seat back is folded so as to be overlapped on the seat cushion, wherein when the seat is adjusted to a seating posture, both ends of the seat cushion in a vehicle width direction are mounted on wheel housings that are bloated from side walls of a vehicle body toward the inside in the vehicle width direction.

19 Claims, 16 Drawing Sheets

VEHICLE SEAT ACCOMMODATING DEVICE

CROSS-REFERENCE TO RELATED APPLICATION

This is the U.S. National Phase Application under 35 U.S.C. §371 of International Patent Application No. PCT/JP2010/065251 filed Sep. 6, 2010, which designated the United States and was published in a language other than English, which claims the benefit of Japanese Patent Application No. 2009-208154 filed on Sep. 9, 2009, and Japanese Patent Application No. 2009-208155 filed on Sep. 9, 2009, all of them are incorporated by reference herein. The International Application was published in Japanese on Mar. 17, 2011 as WO2011/030734 A1 under PCT Article 21(2).

BACKGROUND OF THE INVENTION

1. Field of the Invention

The present invention relates to a vehicle seat accommodating device.

2. Background Art

Among vehicle seats, there is a known structure in which a recess portion is formed in a floor panel behind a seat and the seat is accommodated in the recess portion.

Hitherto, this accommodation type seat is disposed inside a rear wheel housing (for example, refer to Japanese Unexamined Patent Application, First Publication No. H09-207637 and Japanese Unexamined Patent Application, First Publication No. 2008-120334).

Then, when accommodating the seat, the rear surface of the seat cushion is directed upward and the seat is accommodated in the recess portion.

In this kind of seat, when adjusting the seat to a seating posture, a lock portion which is installed in the rear surface of the seat cushion is made to engage with a striker fixed to the vehicle body, so that the seat cushion is fixed to the vehicle body.

When accommodating the seat in the recess portion, the engagement between the lock portion and the striker is released, and the rear surface of the seat cushion is directed upward.

In such a conventional accommodation type seat, since the width between the left and right rear wheel housings is sufficient in a vehicle with a large vehicle width, the width of the seat cushion in the vehicle width direction (hereinafter, referred to as a seat width) may be largely ensured even when the seat is disposed on the inside of the rear wheel housing.

For this reason, for example, the width of seat used for a three-seater may be ensured.

However, since the width between the rear wheel housings is small in the case of a vehicle with a small vehicle width, the seat width is limited when the seat is disposed on the inside of the rear wheel housing.

For this reason, there is a problem in that the width of the three-seater seating seat may not be ensured.

SUMMARY OF THE INVENTION

Therefore, the invention is made in view of the above-described circumstances, and it is an object of the invention to provide a vehicle seat accommodating device capable of accommodating a seat with a large seat width even in a vehicle with a small vehicle width.

In the vehicle seat accommodating device according to the invention, the following means are adopted in order to solve the above-described problems.

(1) A vehicle seat accommodating device related to an aspect of the invention includes a seat configured to include a seat cushion and a seat back supported so as to be tiltable with respect to the seat cushion; an accommodation recess portion formed on a floor located behind the seat; and a support unit movably supporting the seat so as to accommodate the seat in the accommodation recess portion in a state where the seat back is folded so as to be overlapped on the seat cushion, wherein when the seat is adjusted to a seating posture, both ends of the seat cushion in a vehicle width direction are mounted on wheel housings that are bloated from side walls of a vehicle body toward the inside in the vehicle width direction.

(2) The above-described vehicle seat accommodating device (1) may further include a striker provided on the wheel housings; and a lock member which is engageable with the striker and removable from the striker at a rear surface of both ends of the seat cushion in the vehicle width direction.

(3) In the above-described vehicle seat accommodating device (2), the lock member may be provided in a recess portion which is formed on the rear surface of the seat cushion.

(4) The above-described vehicle seat accommodating device (2) may further include a cover member covering an upper position of the lock member when the seat cushion is adjusted to an accommodating posture.

(5) In the above-described vehicle seat accommodating device (4), the cover member may be supported by the rear surface of the seat cushion so as to be rotatable between a first position and a second position, the lock member may be exposed at the first position, the first position may be disposed along the rear surface of the seat cushion, and the lock member may be covered with the cover member at the second position.

(6) The above-described vehicle seat accommodating device (5) may further include a holding member provided between the rear surface of the seat cushion and the cover member, holding the cover member at the first position.

(7) The above-described vehicle seat accommodating device (5) may further include a coupling member coupling the cover member with the vehicle body when the cover member is located at the second position, the coupling member being provided between the cover member and the vehicle body.

(8) In the above-described vehicle seat accommodating device (7), the coupling member may couple the cover member with the vehicle body so as to allow the cover member and the vehicle body to be freely movable in a vertical direction relative to each other.

(9) In the above-described vehicle seat accommodating device according to any one of (4) to (8), the lock member may be formed in a recess portion which is provided at the rear surface of the seat cushion, and the cover member may cover upper positions of the lock member and the recess portion when the seat cushion is adjusted to the accommodating posture.

EFFECTS OF THE INVENTION

According to the aforementioned vehicle seat accommodating device (1), when the seat is adjusted to the seating posture, both ends of the seat cushion in the vehicle width direction is mounted on the wheel housings, the seat width of the seat cushion can be larger than that of the case where the seat cushion is disposed between right and left wheel housings.

In other words, the accommodation type seat with a large seat width may even be mounted in a vehicle with a small vehicle width.

Furthermore, since a space can be formed between the seat cushion in the seating posture and the floor, the usability improves.

In the aforementioned case (2), the seat cushion can be fixed to the wheel housings, and it is possible to stably maintain the seat cushion in the seating posture.

Additionally, as compared with the case where the striker is disposed on the floor, since the striker is provided on the wheel housings, the striker does not become blockade when luggage is loaded to the space in which the seat is accommodated, the times of the luggage being interfered with the striker is reduced.

In the aforementioned case (3), as compared with the case where a lock member is disposed on the rear surface of the seat cushion without providing the recess portion, since the lock member is disposed in the recess portion formed on the rear surface of the seat cushion, the seating face of the seat cushion can be lowered, and it is possible to adjust the seating face to be a suitable height for the usability.

In the aforementioned case (4), when the seat is adjusted to the accommodating posture, since the lock member can be covered with the cover member, is possible to prevent an extraneous material from entering the lock member.

In the aforementioned case (5), since the cover member is integrated together with the seat cushion in one body, the cover member is not missing.

Moreover, when the seat is in the seating posture, the cover member does not interfere.

In the aforementioned case (6), when the seat is in the seating posture, it is possible to stably maintain the cover member in the first position by the holding member.

In the aforementioned case (7), it is possible to stably maintain the cover member by the coupling member in a state where the lock member is covered with the cover member (second position).

In the aforementioned case (8), even where the cover member and the vehicle body upwardly and downwardly vibrate relative to each other, the coupling between the cover member and the vehicle body can be less easily removed, it is possible to inhibit the generation of the sound of the hitting thereof.

In the aforementioned case (9), since the lock member and the recess portion of the seat cushion back face can be covered with the cover when the seat is adjusted to the accommodating posture, not only an extraneous material is prevented from entering the lock member, but also it is possible to inhibit an object from falling in the recess portion of the seat cushion back face.

DESCRIPTION OF THE PREFERRED EMBODIMENTS

Figure 1:
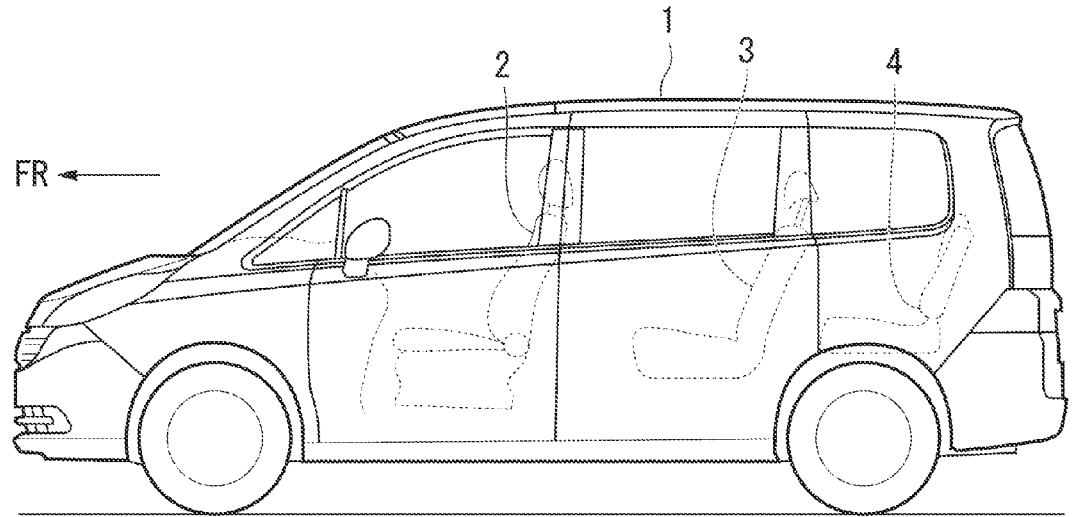
FIG. 1 is a side view showing a vehicle provided with a vehicle seat accommodating device related to an embodiment of the invention.

Hereinafter, a vehicle seat accommodating device according to an embodiment of the invention will be described by referring to FIGS. 1 to 16.

In the description below, the front-rear direction matches the front-rear direction of the vehicle, and the left-right direction matches the vehicle width direction of the vehicle.

Furthermore, in the drawings, FR indicates the front direction of the vehicle body.

As shown in FIG. 1, in the interior of a vehicle 1, a front seat 2, a first rear seat 3, and a second rear seat 4 are sequentially installed on the floor of the vehicle body from the front side toward the rear side in the front-rear direction of the vehicle body.

Among these seats, the second rear seat 4 is a seat which is concerned with the vehicle seat accommodating device according to the embodiment.

FIGS. 2 to 6 illustrate a state where the second rear seat 4 is adjusted to a posture in which a passenger is able to sit thereon (hereinafter, a seating posture).

The second rear seat 4 is a three-seater bench type seat.

The second rear seat 4 includes a seat cushion 5, a seat back 6, and three headrests 7 which are removably attached to the upper portion of the seat back 6.

The seat back 6 is divided into a left seat back portion 6L which corresponds to one passenger sitting on the left side and a right seat back portion 6R which corresponds to two passengers sitting on the right side.

Any of the seat back portions 6L and 6R may be independently inclined in the front-rear direction with respect to the seat cushion 5 about a shaft 8 (see FIG. 4) serving as a support point through a reclining mechanism (not shown) and may be folded so as to be overlapped on the seat cushion 5.

Figure 6:
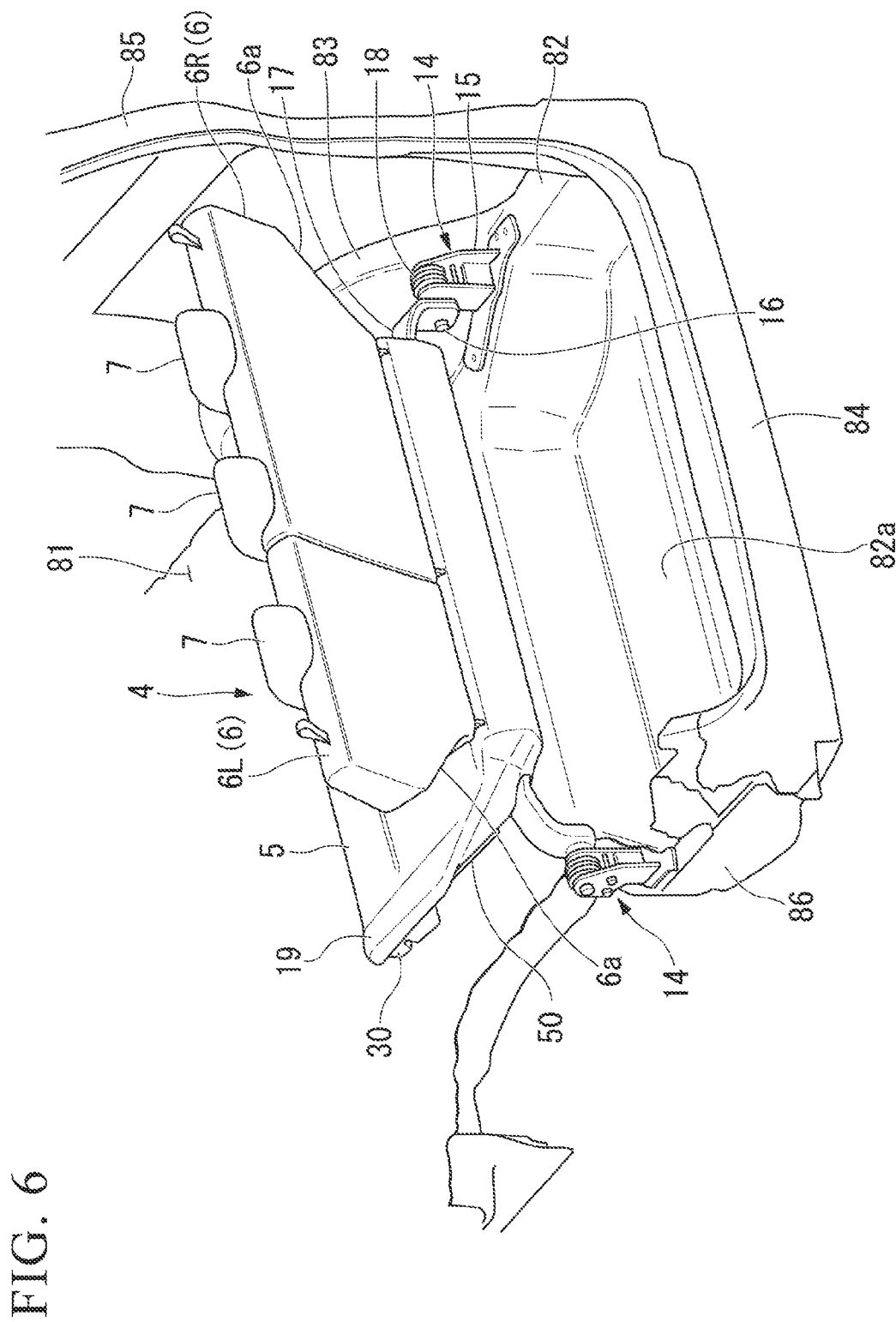
FIG. 6 is an external perspective view showing the vehicle seat accommodating device of the embodiment from the diagonally rear thereof.

As shown in FIG. 6, a seat pan 82 with a recess portion 82a is connected to the rear end of a rear floor 81 of the vehicle body.

Rear wheel housings 83 are connected to the left and right ends of the portion from the rear portion of the rear floor 81 to the front portion of the seat pan 82.

A rear floor end cross member 84 is connected to the rear end of the seat pan 82.

A rear inner panel 85 is connected to the front end of the rear wheel housing 83 and the left and right ends of the rear floor end cross member 84.

The rear wheel housing 83 is bloated from the side wall of the vehicle body toward the inside in the vehicle width direction.

In FIG. 6, the rear wheel housing 83 and the rear inner panel 85 are described only on the right side for convenience of the description, and those disposed on the left side are not shown.

Figure 7:
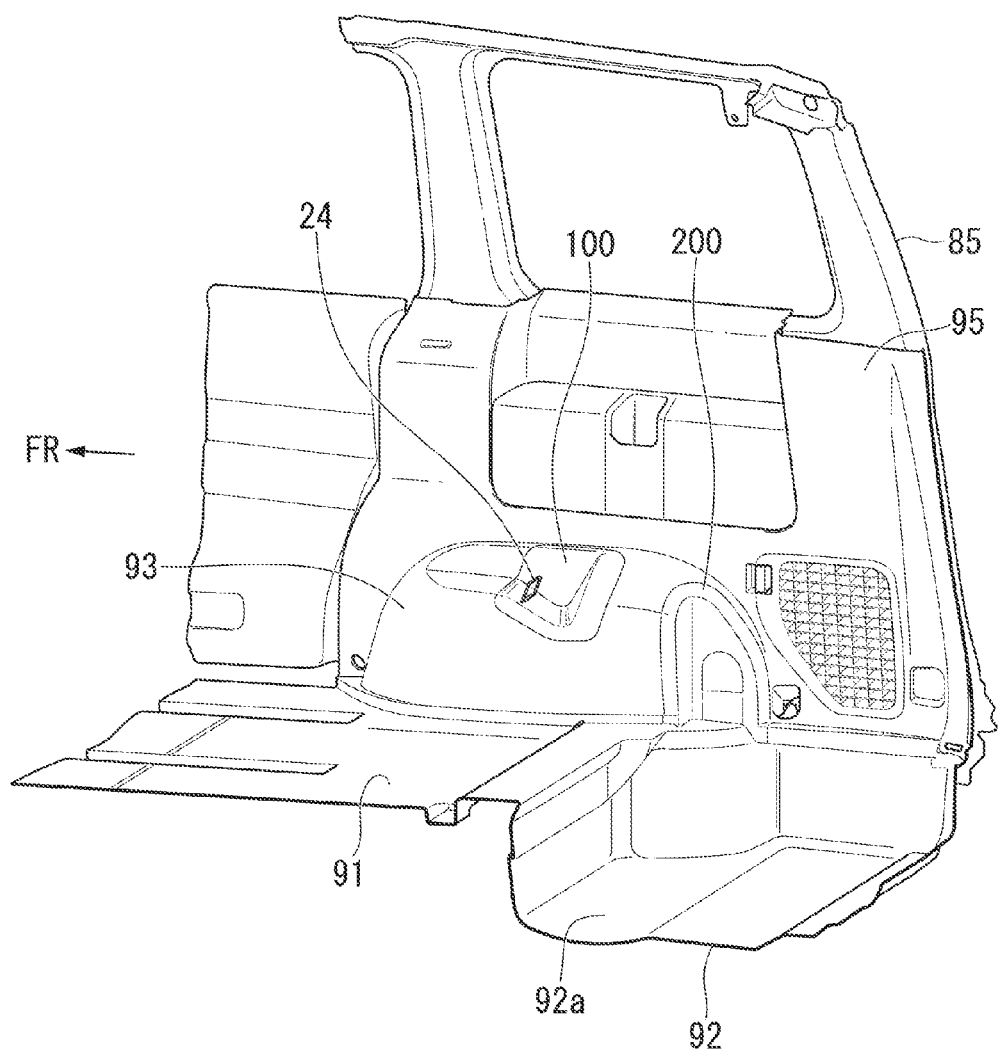
FIG. 7 is a perspective view showing the periphery of the accommodating device before installing a seat in the vehicle.

FIG. 7 illustrates a state where resinous lining materials 91, 92, 93, and 95 are attached to the interior of the vehicle and the second rear seat 4 is not attached thereto.

The rear floor 81 is covered with the rear floor lining 91.

The seat pan 82 is covered with the seat pan lining 92.

The rear wheel housing 83 is covered with the rear wheel housing lining 93.

The rear inner panel 85 is covered with the rear inner panel lining 95.

The recess portion of the seat pan lining 92 is formed so as to correspond to the recess portion 82a of the seat pan 82, and serves as an accommodation recess portion 92a which accommodates the second rear seat 4 as described below.

A striker lead 100 through which a striker 24 to be described later is inserted and an arm lead 200 through which an arm 17 of a support device 14 to be described later is inserted are attached to the rear wheel housing lining 93.

The seat cushion 5 is supported so as to be rotatable in the front-rear direction by a pair of left and right support devices (support units) 14 which are fixed to the side portions of the rear wheel housings 83 serving as the front edge of the seat pan 82.

Each support device 14 includes: a support frame 15 which is fixed to a rear frame (not shown) together with the seat pan 82, an arm 17 which is supported by the support frame 15 so as to be rotatable about the shaft 16, a spring 18 which biases the arm 17 in a direction in which the arm stands up (a direction in which the seat cushion 5 is returned to the seating posture), and the like.

The shaft 16 is disposed at a position which is higher than the rear floor 81 by a predetermined height.

The arm 17 is formed in a substantially L-shape, and when the second rear seat 4 is adjusted to the seating posture, the arm extends upward in an upright posture from the support frame 15 and is obliquely bent upward from the middle portion toward the inside in the vehicle width direction.

The front end of each arm 17 is fixed to the left and right rear ends of the seat cushion 5.

Figure 5:
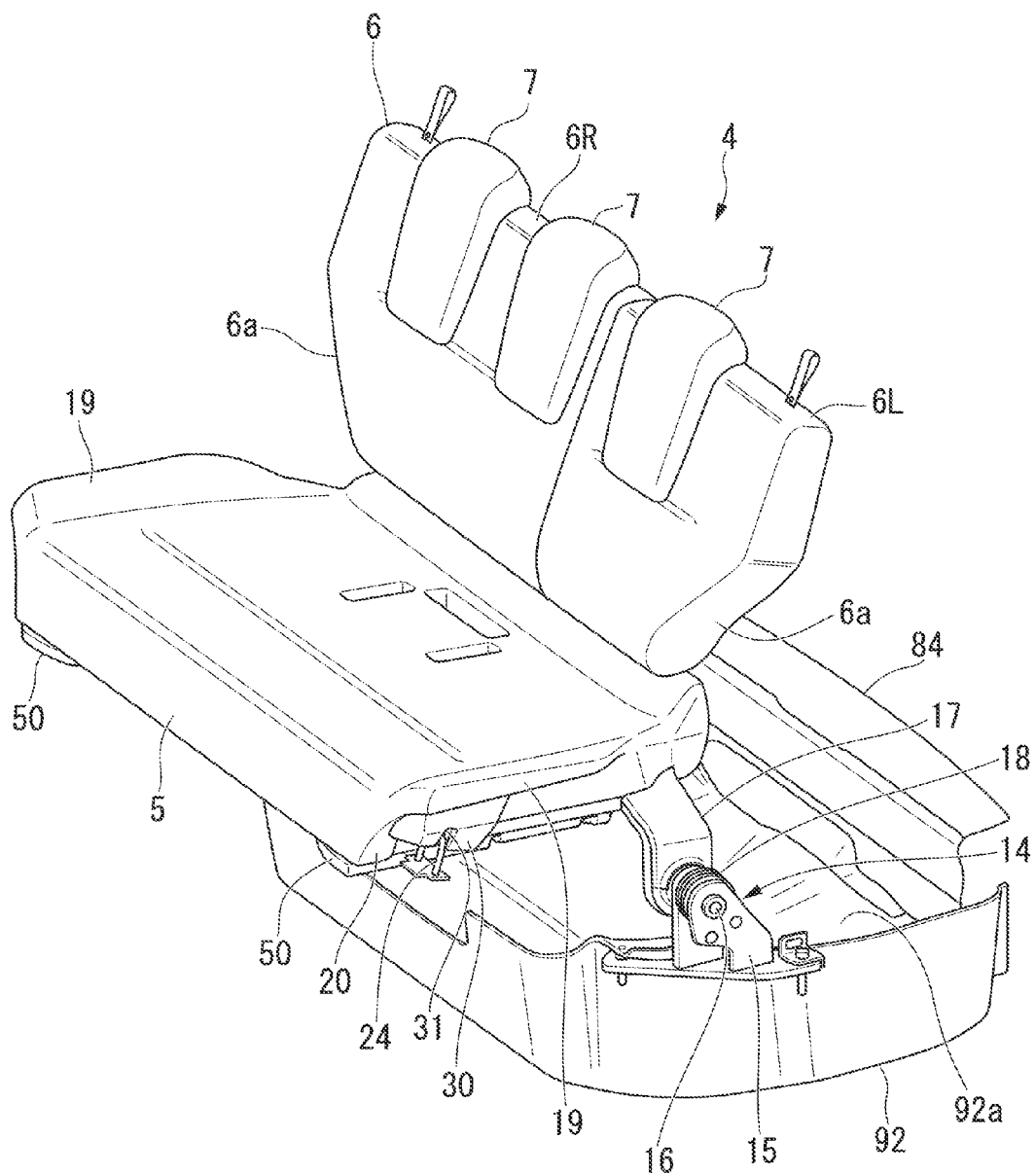
FIG. 5 is an external perspective view showing the vehicle seat accommodating device of the embodiment from the diagonally front thereof.

As shown in FIGS. 5 and 6, the width of the front end of the seat cushion 5 is shorter than the width of the rear end thereof.

Figure 2:
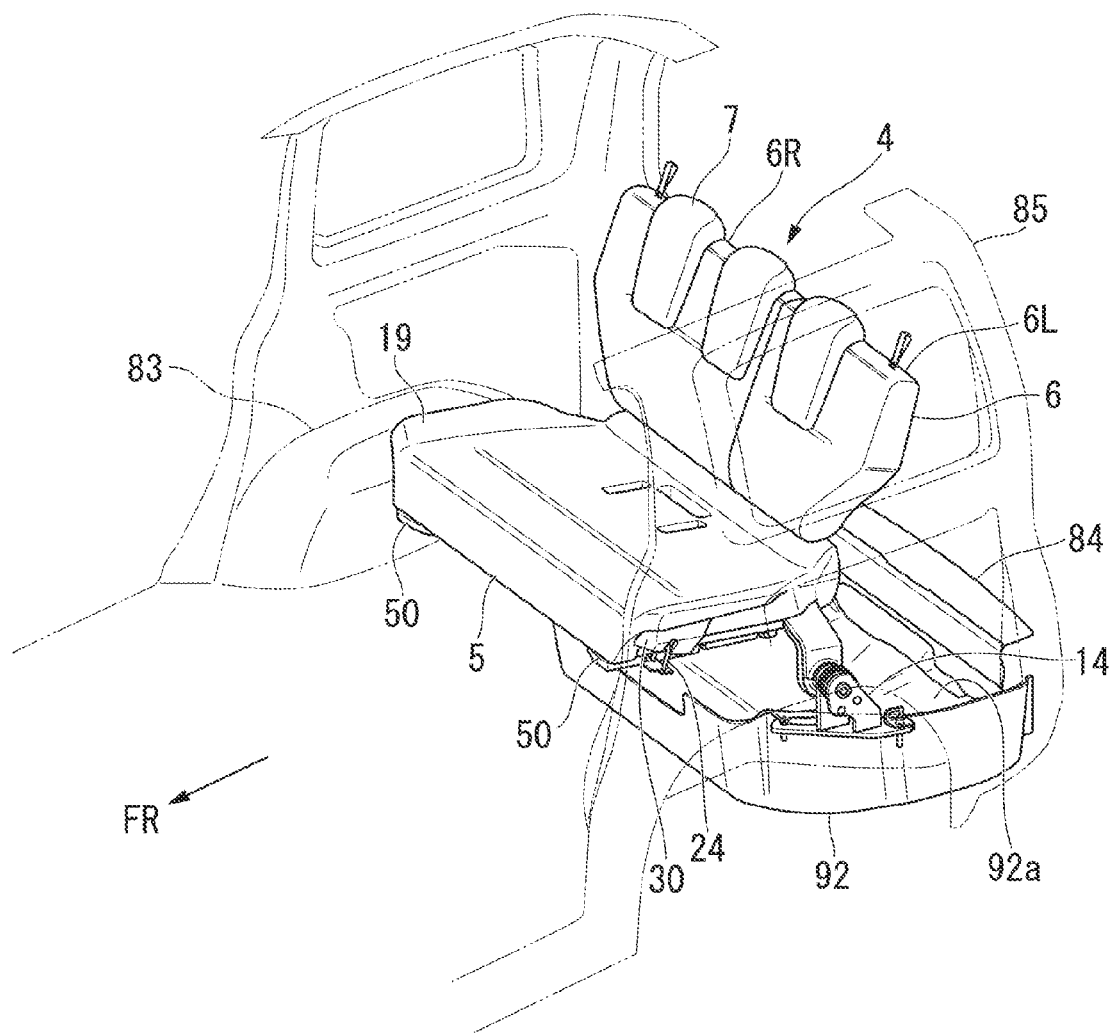
FIG. 2 is an external perspective view showing the vehicle seat accommodating device of the embodiment while seeing through a vehicle body panel of the vehicle.
Figure 3:
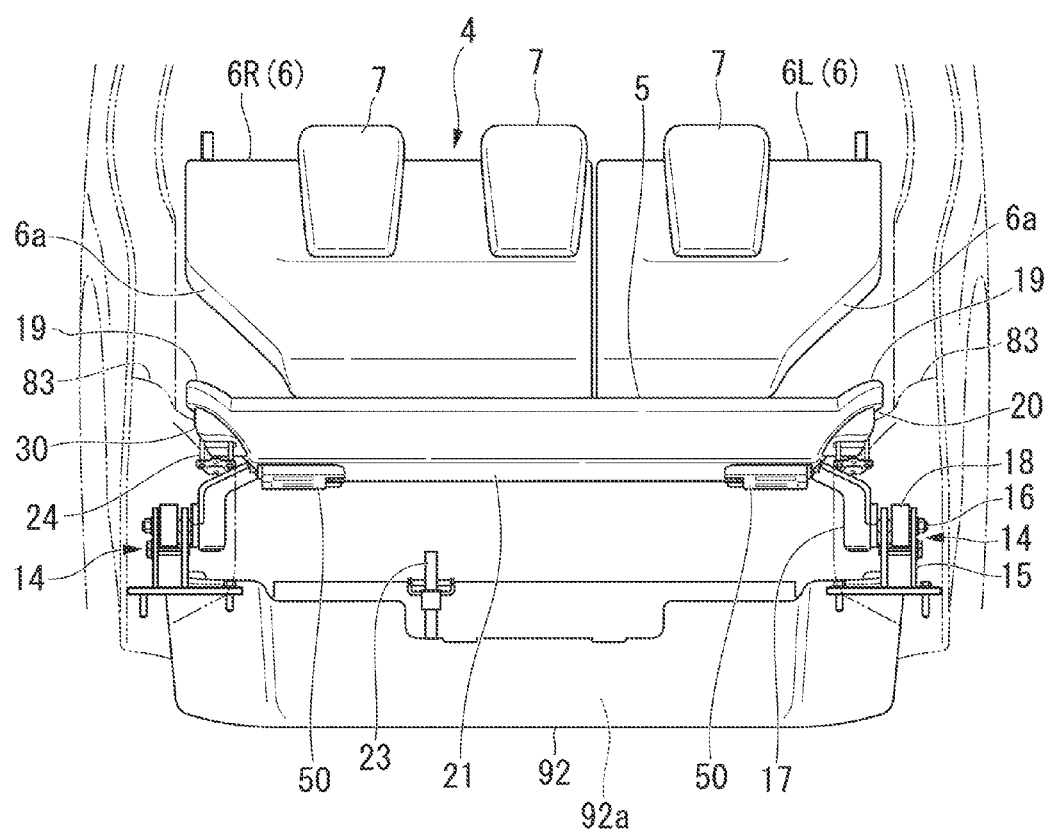
FIG. 3 is a front view showing the vehicle seat accommodating device of the embodiment.

Additionally, as shown in FIGS. 2 and 3, when the second rear seat 4 is adjusted to the seating posture, the left and right ends 19 of the seat cushion 5 are positioned above the left and right rear wheel housings 83.

The left and right ends 19 of the seat cushion 5 are formed in a shape of which the lower side is cut in a circular-arc shape.

In other words, a recess portion 20 which is cut in a circular-arc shape is formed in the rear surface of the end 19 of the seat cushion 5.

The bottom surface portion 21 which connects the lower edges of the left and right ends 19 in the rear surface of the seat cushion 5 is formed in a substantially rectangular shape in the plan view.

The front end of the arm 17 of the support device 14 is fixed to each of the left and right rear ends of the bottom surface portion 21.

Figure 4:
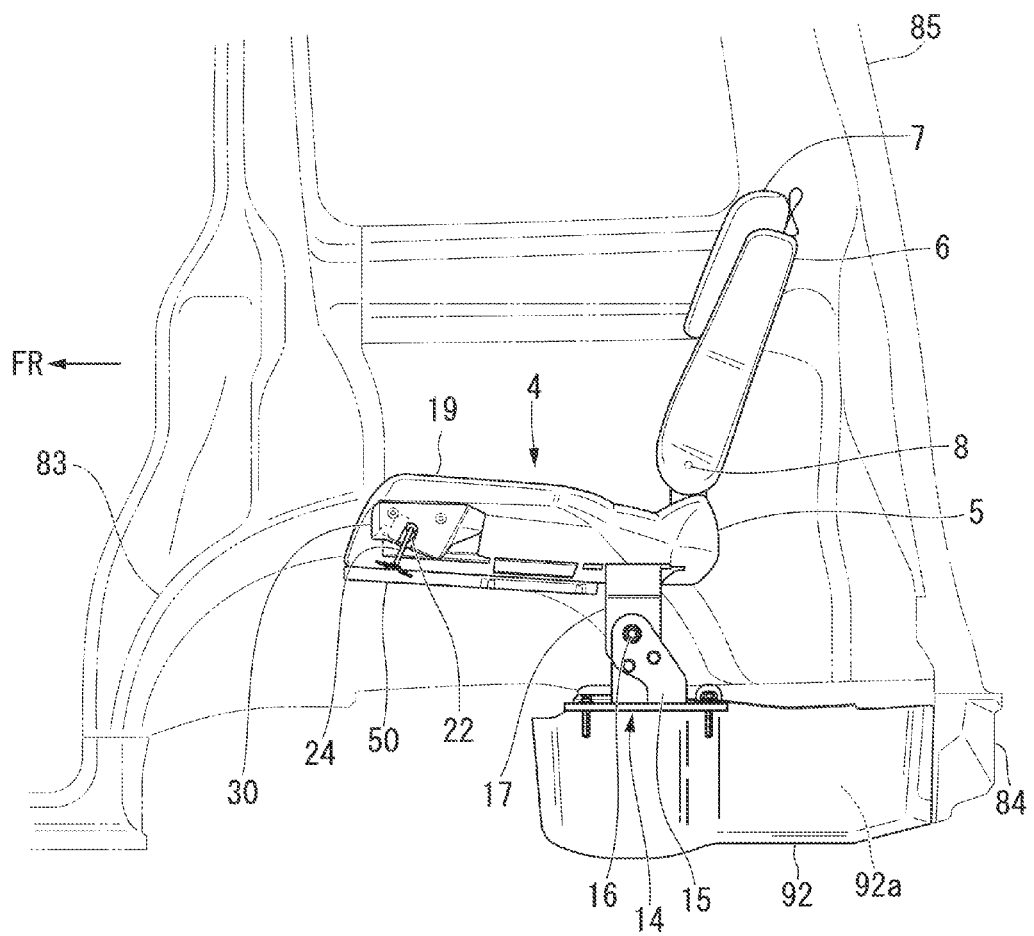
FIG. 4 is a side view showing the vehicle seat accommodating device of the embodiment.

As shown in FIGS. 2 and 4, the front edges of the left and right ends 19 of the seat cushion 5 are positioned above the substantial center of the rear wheel housing 83 in the front-rear direction.

As shown in FIG. 4, a latch (a lock member) 22 which locks the seat cushion 5 in the seating posture and a latch cover 30 which covers the latch 22 are attached to the front ends of the left and right recess portion 20 of the seat cushion 5.

Then, the striker 24, which is formed in a reverse U-shape and with which the latch 22 separably engages, is fixed to the upper portion of the substantially center portion of each of the left and right rear wheel housings 83 in the front-rear direction in a slightly inclined posture.

As shown in FIG. 5, the latch cover 30 is provided with a groove hole 31 which embraces the striker 24.

Figure 8:
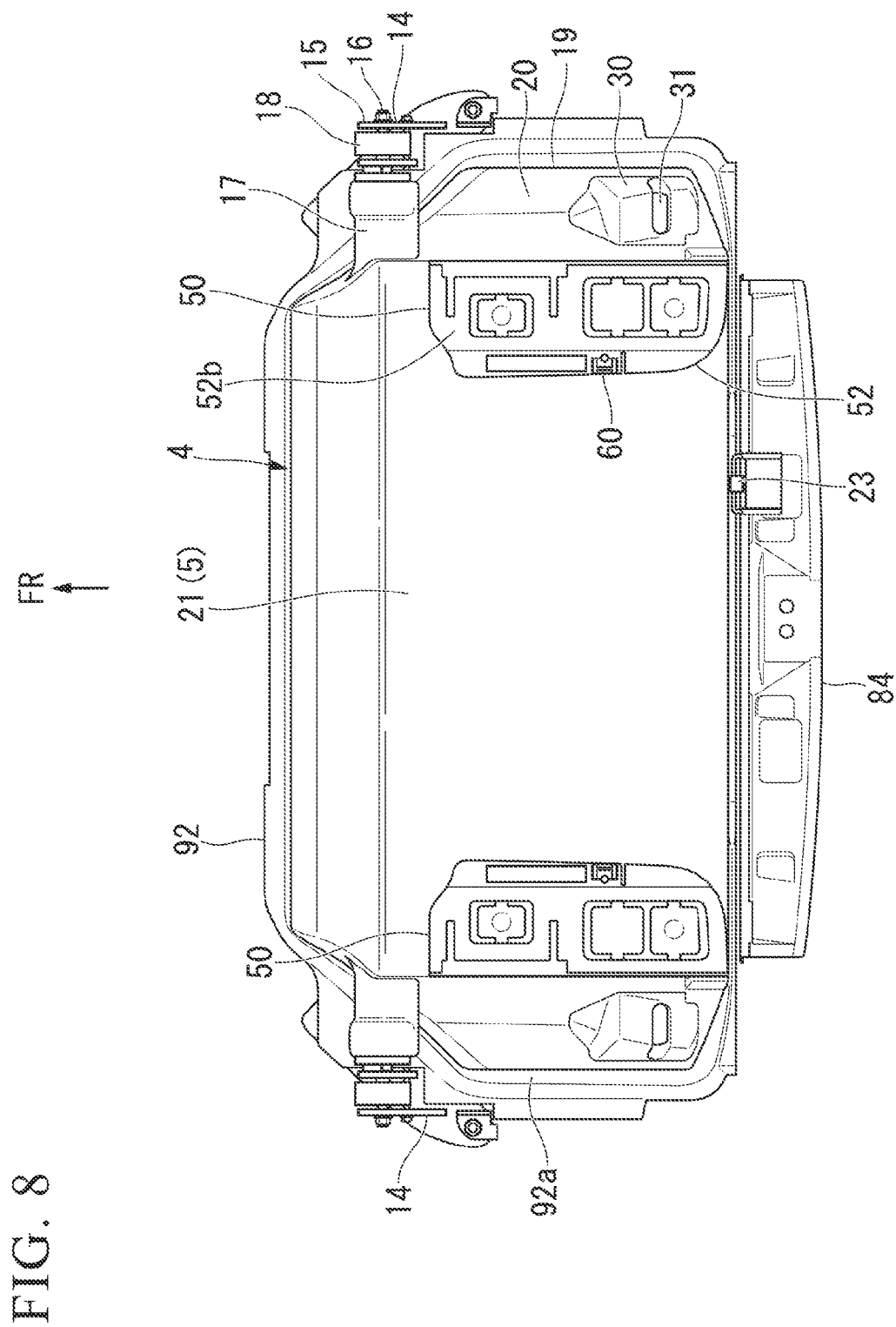
FIG. 8 is a plan view showing the seat being adjusted to an accommodating posture in the vehicle seat accommodating device of the embodiment.

When the second rear seat 4 is folded from the seating posture so that the left and right seat back portions 6L and 6R of the seat back 6 are overlapped on the seat cushion 5 and the folded second rear seat 4 is rotated backward about the shaft 16 of the support device 14, the folded second rear seat 4 may be accommodated in the accommodation recess portion 92a of the seat pan lining 92 as shown in FIG. 8 in a state where the upper and lower portions are reversed.

In this accommodation state, the bottom surface portion 21 of the seat cushion 5 of the second rear seat 4 is directed upward, and the rear floor lining 91 and the bottom surface portion 21 of the seat cushion 5 are flush with each other so as to serve as a part of the floor.

For this reason, the outer peripheral shape of the accommodation recess portion 92a of the seat pan lining 92 is set so as to match the outer peripheral shape in which the folded second rear seat 4 is reversed.

Moreover, the depth of the accommodation recess portion 92a is set to the thickness of the seat cushion 5 and the seat back 6 of the folded second rear seat 4.

Notches 6a are formed in the lower portion of the left end of the left seat back portion 6L and the lower portion of the right end of the right seat back portion 6R so that the seat back 6 and the rear wheel housing lining 93 do not interfere with each other when the folded second rear seat 4 rotates backward.

Hereinafter, the posture of the second rear seat 4 when the folded second rear seat 4 of which the upper and lower portions are reversed is accommodated in the accommodation recess portion 92a is referred to as an accommodating posture.

When the second rear seat 4 being in the accommodating posture is accommodated in the accommodation recess portion 92a in this way, the recess portion 20 is exposed as shown in FIG. 8 since the recess portion 20 is exposed to the rear surfaces of the left and right ends 19 of the seat cushion 5.

In addition, since the latch cover 30 which covers the latch 22 is attached to the recess portion 20 of the seat cushion 5, the latch cover 30 is exposed.

In this way, when the recess portion 20 or the latch cover 30 is exposed, it is considered that not only the appearance may be poor, but luggage or the like may drop into the recess portion 20 or the latch 22 may be adversely affected by anything that enters from the groove hole 31 of the latch cover 30.

For example, in Japanese Unexamined Patent Application, First Publication No. 2003-212017, the lock member is attached so that the posture thereof changes, whereby the lock member is pulled into the recess portion which is provided in the rear surface of the seat cushion with the operation in which the seat is accommodated.

Furthermore, a link mechanism is installed between the seat and the lock member.

However, in the vehicle seat disclosed in Japanese Unexamined Patent Application, First Publication No. 2003-212017, the attachment structure of the lock member in the rear surface of the seat cushion becomes complicated and the link mechanism is also needed, which complicates the configuration of the seat and increases costs.

Therefore, in the embodiment, a seat end cover 50 which covers the upper side of the recess portion 20 of the seat cushion 5 when the second rear seat 4 is adjusted to the accommodating posture is integrally attached to the bottom surface portion 21 of the seat cushion 5.

Figure 10:
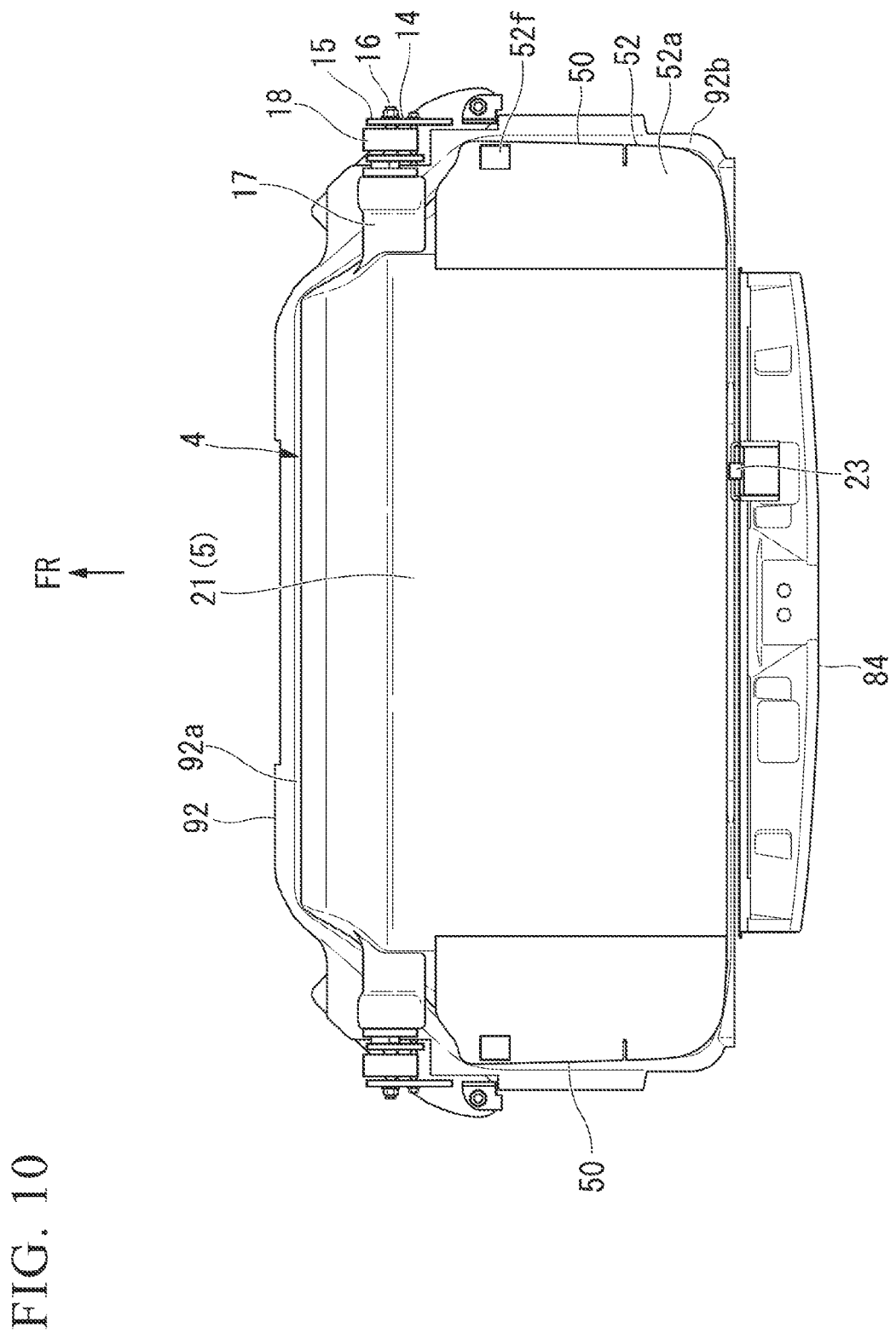
FIG. 10 is a plan view showing the seat end being covered with a cover when the seat is adjusted to an accommodating posture in the vehicle seat accommodating device of the embodiment.

As shown in FIGS. 3 to 6, the seat end cover 50 exposes the latch cover 30 when the second rear seat 4 is adjusted to the seating posture. Then, as shown in FIGS. 10 and 11, the seat end cover covers the upper side of the recess portion 20 only when the second rear seat 4 is in the accommodating posture.

Accordingly, foreign matter may be prevented from intruding into the recess portion 20 or the latch 22 with a simple configuration.

Hereinafter, referring to FIGS. 8 to 16, the configuration of the seat end cover 50 and the attachment structure of the seat cushion 5 will be described.

Figure 9:
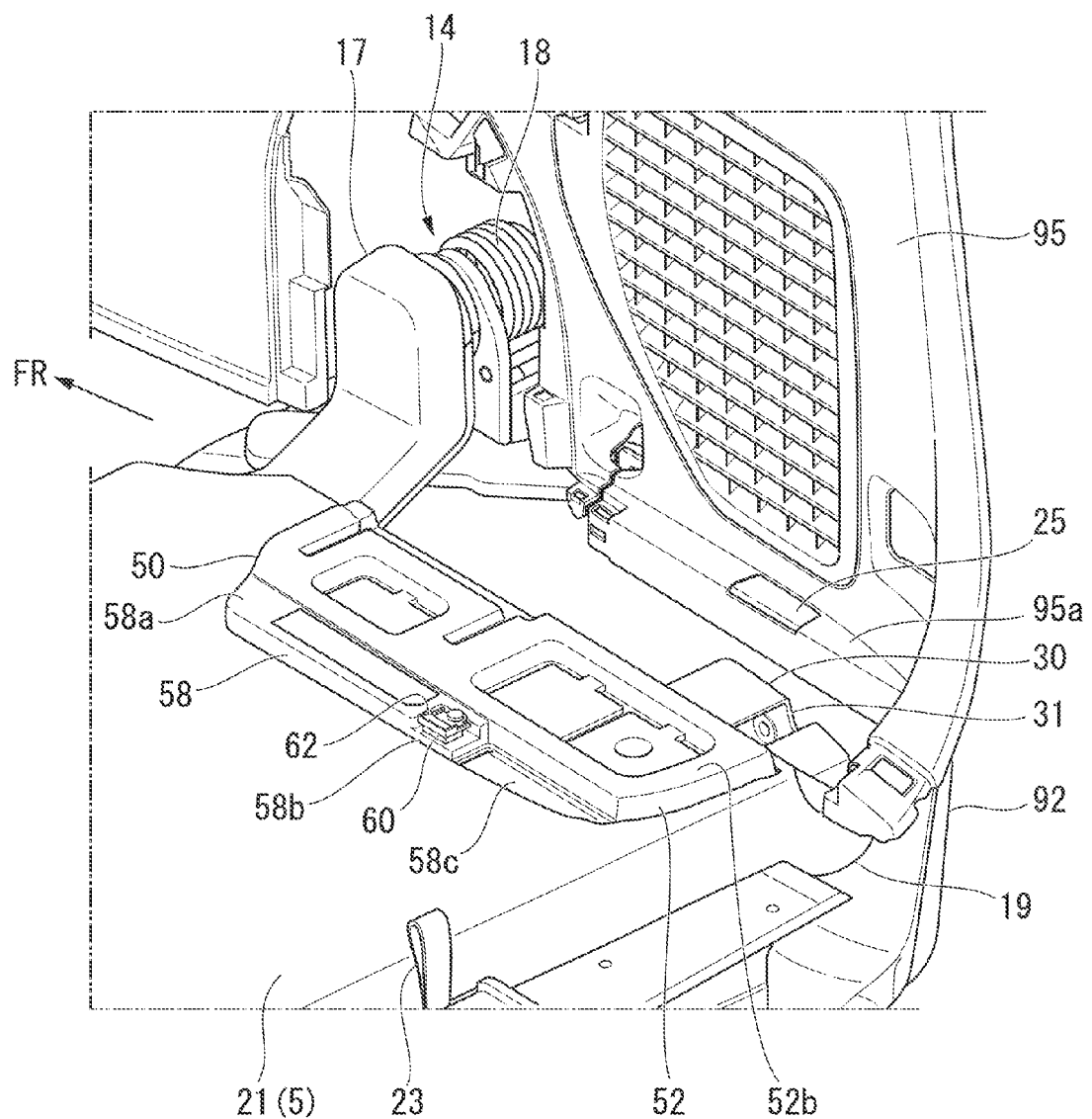
FIG. 9 is an enlarged perspective view showing the relevant part when the seat is adjusted to an accommodating posture in the vehicle seat accommodating device of the embodiment.
Figure 11:
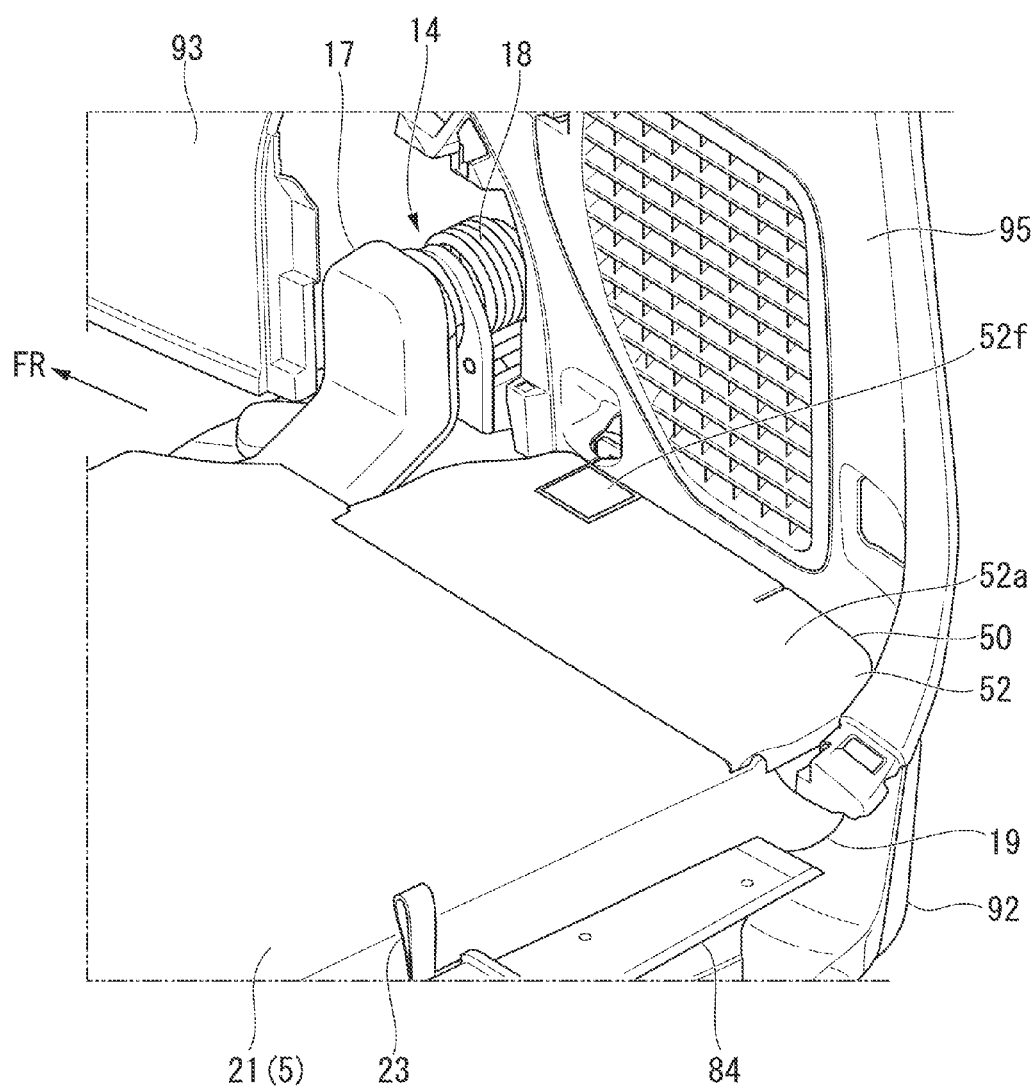
FIG. 11 is an enlarged perspective view showing the relevant part when the seat is adjusted to an accommodating posture in the vehicle seat accommodating device of the embodiment and a seat end is covered with the cover.

FIGS. 9 and 11 illustrate cases where the arm lead 200 is detached from the rear wheel housing lining 93.

Figure 12:
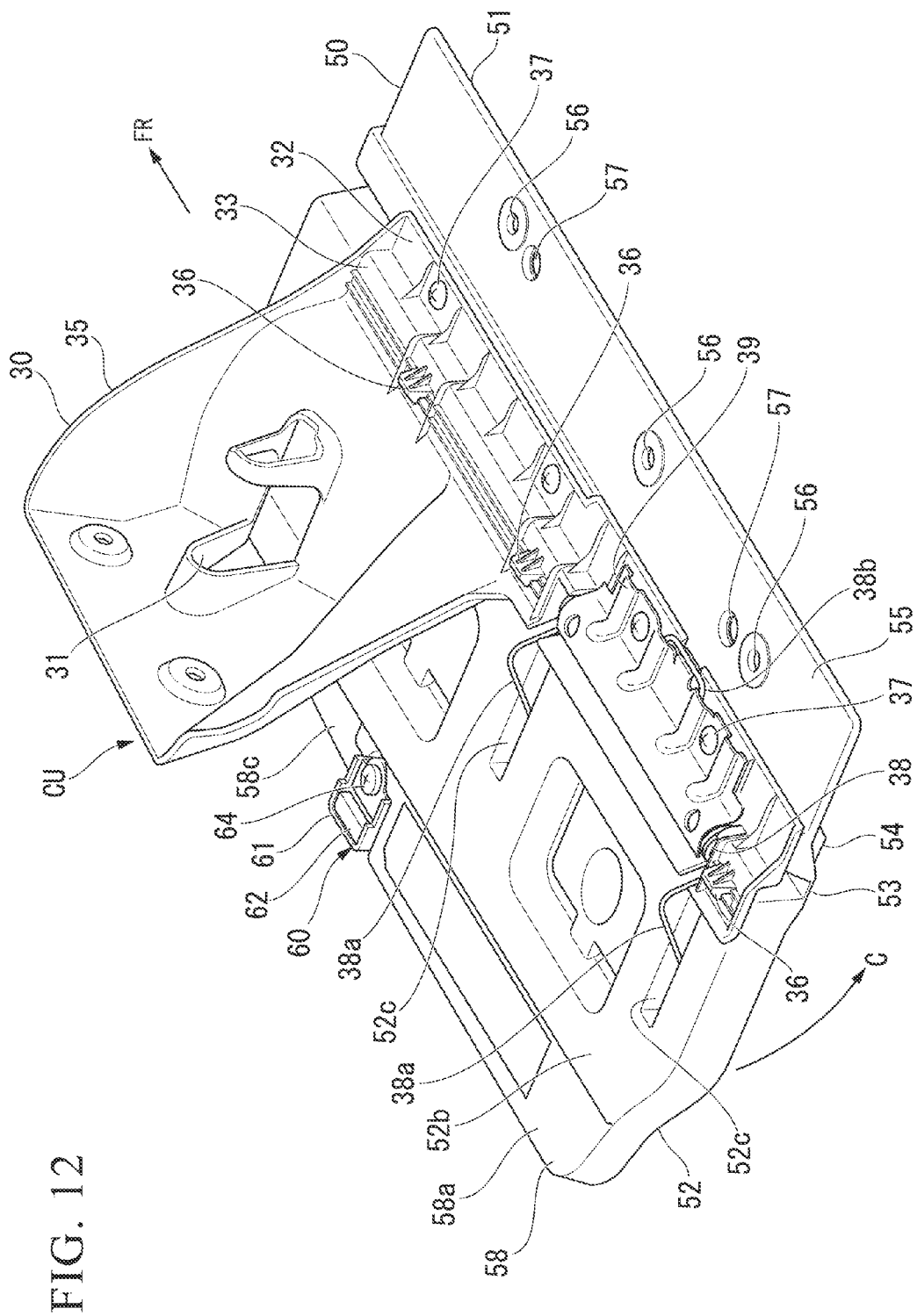
FIG. 12 is a perspective view showing a cover unit in the embodiment as seen from the rear surface.

As shown in FIG. 12, the seat end cover 50 is integrated with the latch cover 30, thereby forming a cover unit CU.

FIG. 12 is a diagram when the cover unit CU is seen from the rear surfaces of the seat end cover 50 and the latch cover 30.

In the description of the configuration of the cover unit CU, the front-rear direction is set as the front-rear direction of the vehicle body in the seat cushion 5 being in the seating posture unless otherwise noted.

The seat end cover 50 is integrally molded from a resin.

In the seat end cover 50, the attachment flange portion 51 which is fixed to the seat cushion 5 and the cover body (the cover member) 52 which covers the upper side of the recess portion 20 are connected to each other through a thin hinge portion 53.

The attachment flange portion 51 includes a thick portion 54 which is formed along the thin hinge portion 53 and a thin portion 55 which extends outward from the thick portion 54.

The thin hinge portion 53 extends to a front surface 54a of the thick portion 54, and the thin portion 55 extends to the rear surface 54b of the thick portion 54.

The thin portion 55 is provided with three fixing screw holes 56 which are spaced apart from each other in the front-rear direction and two temporary setting holes 57 which are disposed so as to be adjacent to the fixing screw holes 56.

Figure 16:
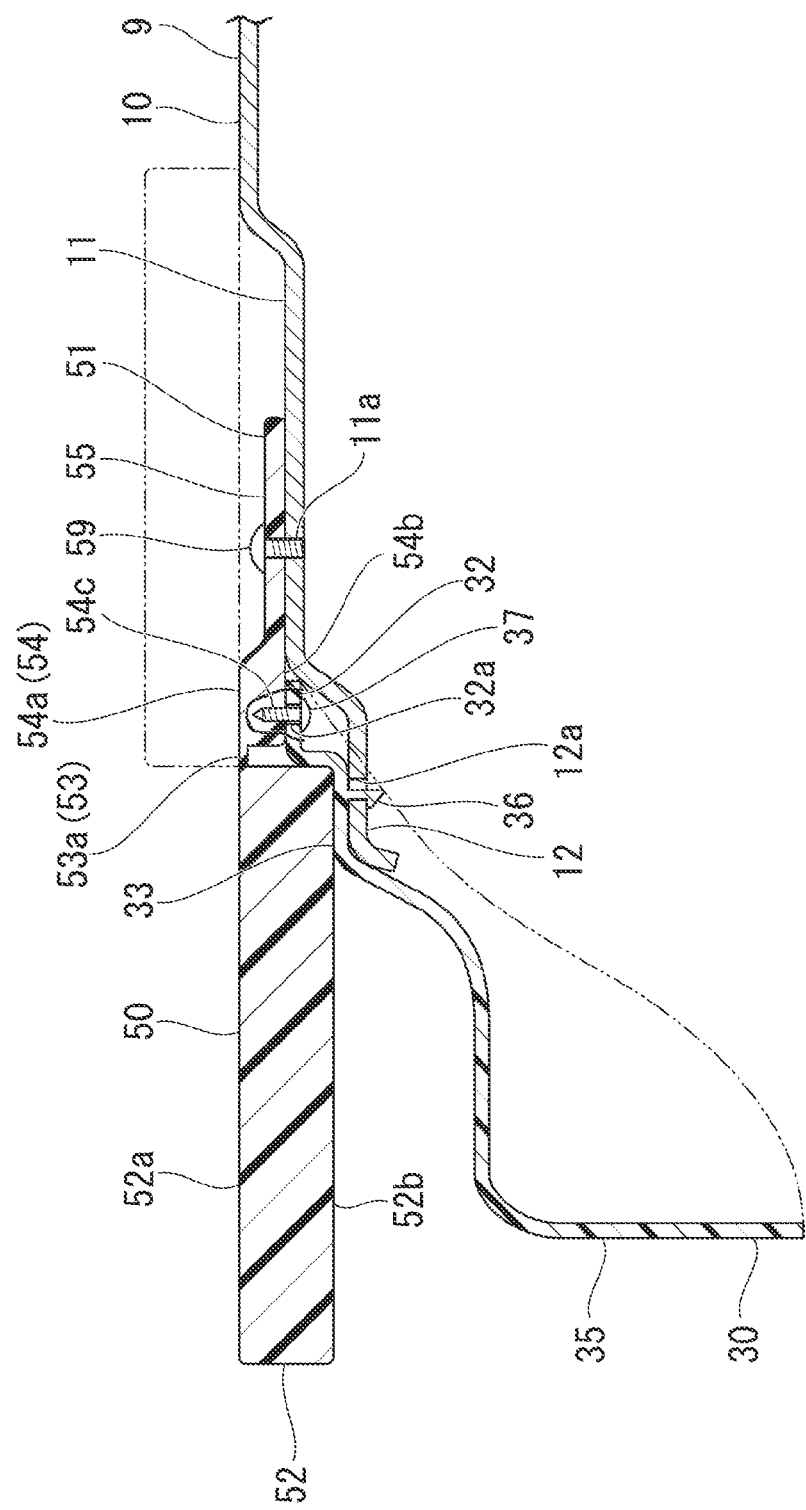
FIG. 16 is a cross-sectional view showing the attachment portion shown in FIG. 14.

As shown in FIG. 16, the rear surface 54b of the thick portion 54 is provided with four screw holes 54c to which the latch cover 30 to be described later is fixed.

Figure 14:
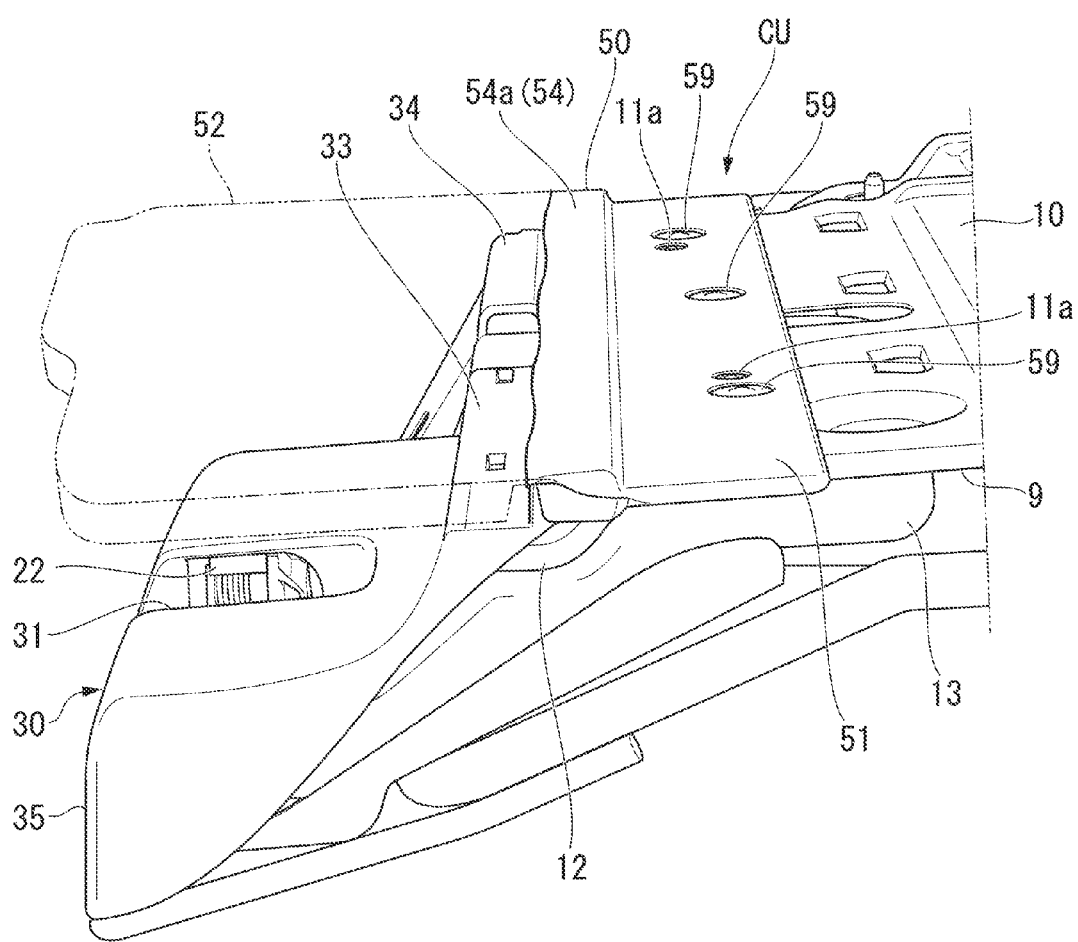
FIG. 14 is a perspective view showing an attachment portion of the cover unit with respect to a seat cushion frame of the embodiment.
Figure 15:
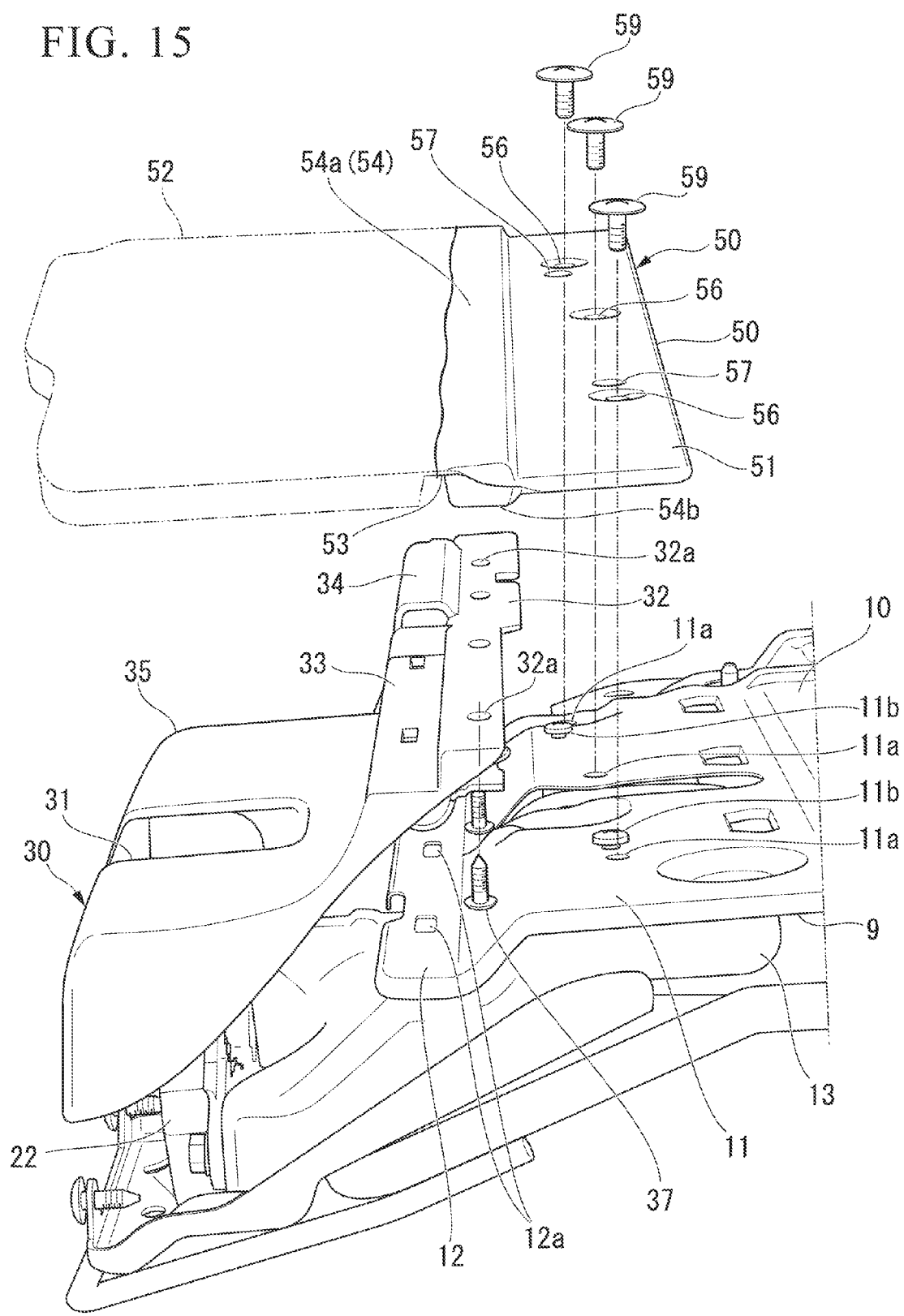
FIG. 15 is an exploded perspective view showing the attachment portion shown in FIG. 14.

As shown in FIGS. 14 to 16, a front surface 52a of a cover body 52, a front surface 53a of the thin hinge portion 53, and the front surface 54a of the thick portion 54 of the attachment flange portion 51 are formed so as to be substantially flush with each other.

As shown in FIG. 10, the outer peripheral shape of the cover body 52 is set so that the cover body does not interfere with the arm 17 of the support device 14 and covers most of the recess portion 20 when the cover body 52 is opened while the second rear seat 4 is in the accommodating posture.

The front surface 52a of the cover body 52 is formed as a flat surface and a hook-and-loop fastener 52f is attached to the rear end of the front surface 52a in the left-right direction.

When the cover body 52 is overlapped on the bottom surface portion 21 of the seat cushion 5 as shown in FIGS. 8 and 9, the hook-and-loop fastener 52f adheres to an epidermis material (not shown) which covers the bottom surface portion 21, thereby preventing the cover body 52 from being separated from the bottom surface portion 21 of the seat cushion 5.

In this embodiment, the epidermis material which covers the hook-and-loop fastener 52f and the bottom surface portion 21 forms a holding member.

The height (thickness) of the cover body 52 is higher (thicker) the thick portion 54 of the attachment flange portion 51, and the outer end 58 of the rear surface 52b of the cover body 52 in the left-right direction is formed so as to be lower by one level than the inner assembly portion in the left-right direction.

Furthermore, as shown in FIG. 9, the end 58 is formed in a step shape in the front-rear direction, where the highest upper step 58a is formed at the front side, the lowest lower step 58c is formed at the rear side, and a middle step 58b is formed between the upper step 58a and the lower step 58c.

Then, a coupling device 60 is attached to the middle step 58b.

Figure 13:
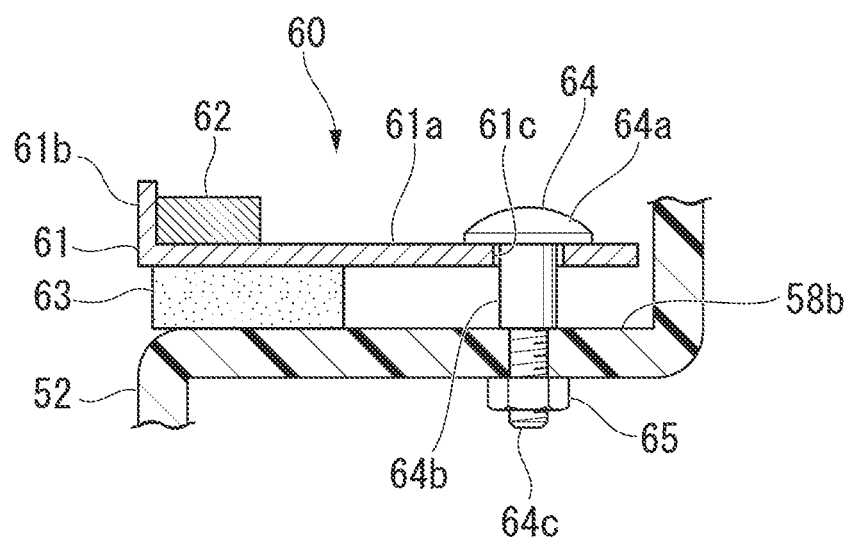
FIG. 13 is a cross-sectional view showing a coupling device of the embodiment.

As shown in FIGS. 12 and 13, the coupling device 60 includes: a metallic casing 61 which is formed by a peripheral wall portion 61b uprightly formed from the outer edge of the bottom wall portion 61a; a magnet 62 which is fixed to the bottom wall portion 61a of the casing 61; an elastic member 63 which is fixed between the rear surface of the bottom wall portion 61a and the middle step 58b of the cover body 52, and a bolt 64 and a nut 65 which attaches the casing 61 to the middle step 58b.

The elastic member 63 may be formed of, for example, a sponge, and may be fixed to any one of the bottom wall portion 61a and the middle step 58b.

The bolt 64 includes a boss portion 64b which is formed between a head portion 64a and a screw portion 64c so as to have a diameter larger than the screw portion 64c.

While the boss portion 64b is loosely inserted into the hole 61c provided in the bottom wall portion 61a of the casing 61 and the end surface of the boss portion 64b is latched to the middle step 58b, the nut 65 is fastened to the screw portion 64c which penetrates the middle step 58b.

Accordingly, the casing 61 is attached to the middle step 58b so as not to separate therefrom.

In the coupling device 60 which is formed in this way, the casing 61 is freely movable downward in FIG. 13 by a stroke in which the elastic member 63 is elastically compressible.

The latch cover 30 is integrally molded from a resin, and as shown in FIGS. 12, 14, and 15, includes: a fixing portion 32 which is fixed to the seat end cover 50; a latch portion 33 which extends to the fixing portion 32 through a step; a spring accommodating portion 34 which is disposed on the same line as that of the latch portion 33 and extends to the fixing portion 32; and a latch cover body 35 which extends to the latch portion 33.

When the latch cover 30 is seen from the front surface as shown in FIG. 15, the latch portion 33 is positioned below the fixing portion 32, the spring accommodating portion 34 protrudes upward in relation to the fixing portion 32, and the latch cover body 35 is positioned below the latch portion 33.

The fixing portion 32 is provided with four screw insertion holes 32a which are spaced in the front-rear direction.

As shown in FIG. 12, the rear surface of the latch portion 33 is provided with three latch claws 36 which are formed in a substantially reverse L-shape in a protruding manner and are spaced in the front-rear direction.

All latch claws 36 are directed toward the side where the latch cover body 35 is disposed.

The latch cover body 35 is formed in a predetermined cup shape and has an inner space sufficient for accommodating the latch 22 fixed to the seat cushion 5.

As described above, the latch cover body 35 is provided with the groove hole 31 which embraces the striker 24.

The latch cover 30 is fixed to the seat end cover 50 in a manner such that the fixing portion 32 is brought into contact with the thick portion 54 of the attachment flange portion 51 of the seat end cover 50 and the screw 37 which passes through the screw insertion hole 32a of the fixing portion 32 is threaded into the screw insertion hole 54c of the thick portion 54.

Furthermore, a spring presser 39 which accommodates the spring 38 in the spring accommodating portion 34 and prevents the separation of the spring 38 from the seat end cover 50 is fixed to the seat end cover 50 using the screw 37 at the same time of fastening the latch cover 30 to the seat end cover 50 through the screw 37.

The spring 38 biases the cover body 52 of the seat end cover 50 in a blocking direction (a direction in which the cover body is overlapped on the fixing portion 32) as depicted by the arrow C in FIG. 12.

Both L-shaped ends 38a of the spring 38 are latched to a latch groove 52c of the rear surface 52b of the cover body 52, and a holding portion 38b which is formed by bending the middle portion of the spring 38 in a U-shape is nipped between the thick portion 54 and the spring presser 37.

The cover unit CU with such a configuration is present at the rear side of the left and right ends of the bottom surface portion 21 of the seat cushion 5 as shown in FIGS. 8 and 10, and is attached to a position where the cover body 52 does not interfere with the arm 17 of the support device 14 when the second rear seat 4 is accommodated in the accommodation recess portion 92a and the cover body 52 is opened as shown in FIGS. 10 and 11.

The cover unit CU is fixed to a metallic seat cushion frame 9 of the seat cushion 5 as shown in FIGS. 14 and 15.

In the exploded perspective view of FIG. 15, for convenience of description, the cover unit CU is also exploded.

The end of the seat cushion frame 9 in the left-right direction is formed in a step shape.

A fixing seat portion 11 is connected to the outside of the bottom wall portion 10 corresponding to the bottom surface portion 21 of the seat cushion 5, and the latch seat portion 12 is connected to the outside of the fixing seat portion 11.

In the seating posture of the seat cushion 5, the fixing seat portion 11 is positioned above the bottom wall portion 10 (downwards in FIG. 15), and the latch seat portion 12 is positioned above the fixing seat portion 11.

In the fixing seat portion 11, three screw holes 11a are provided therein so as to correspond to the fixing screw holes 56 of the seat end cover 50, and two screws 11b are attached thereto so as to correspond to the temporary setting holes 57 of the seat end cover 50.

The inner diameter of the temporary setting hole 57 is larger than the head portion of the screw 11b.

The latch seat portion 12 is provided with three latch holes 12a which correspond to the latch claws 36 of the latch cover 30.

The latch hole 12a is set to a size such that the latch claw 36 may be inserted therethrough.

Additionally, the latch attachment bracket 13 is fixed to the end of the seat cushion frame 9 in the left-right direction.

The latch 22 is fixed to the latch attachment bracket 13.

The cover unit CU is fixed to the seat cushion frame 9 according to the following procedure.

As shown in FIG. 15, the front and rear sides of the seat cushion 5 are reversed so that the bottom wall portion 10 of the seat cushion frame 9 is positioned at the upper side, and the screw 11b is temporarily attached so that the head portion protrudes from the fixing seat portion 11 of the seat cushion frame 9 by a predetermined length.

Then, the seat end cover 50 is made to approach the upper side of the seat cushion frame 9, and the screw 11b is inserted through the temporary setting hole 57 of the seat end cover 50.

The screw 11b is in a temporary attachment state so that the head portion of the screw 11b is positioned slightly above the attachment flange portion 51 in this state.

Accordingly, the latch claw 36 of the latch cover 30 may be positioned so as to be directly close to the latch hole 12a without the latch hole 12a of the seat cushion frame 9, which is hidden by the latch cover 30, being directly visible.

Next, the latch claw 36 is inserted into the latch hole 12a by minutely adjusting the position of the cover unit CU, and the attachment flange portion 51 of the seat end cover 50 is brought into contact with the fixing seat portion 11 of the seat cushion frame 9.

Subsequently, when the cover unit CU moves in parallel in a direction in which it separates from the seat cushion frame 9 (that is, outward in the left-right direction), the latch claw 36 is latched to the latch hole 12a.

In this state, the screw 11b is positioned at the substantial center of the temporary setting hole 57, and the fixing screw hole 56 of the attachment flange portion 51 matches the screw hole 11a provided in the fixing seat portion 11.

Since the head portion of the screw 11b is positioned slightly above the attachment flange portion 51, the screw 11b inside the temporary setting hole 57 is horizontally movable with respect to the attachment flange portion 51.

Then, in a state where the latch claw 36 is latched to the latch hole 12a, the screw 59 is inserted through the fixing screw hole 56 of the attachment flange portion 51, and is threaded into the screw hole 11a of the fixing seat portion 11.

Accordingly, the cover unit CU is fixed to the seat cushion frame 9.

Finally, the screw 11b is fastened.

The temporary setting hole 57 is set to have an inner diameter sufficient for the series of operations of attaching the cover unit CU.

In this way, since the latch claw 36 of the latch cover 30 is latched to the latch hole 12a of the seat cushion frame 9, the cover unit CU may be easily and accurately positioned with respect to the seat cushion frame 9.

Furthermore, even when the latch cover 30 is not directly threaded into the seat cushion frame 9, the latch cover 30 may be prevented from being vibrated with respect to the seat cushion frame 9.

Accordingly, the cover unit CU may be easily attached to the seat cushion frame 9.

When the second rear seat 4 is used in the seating posture, the cover body 52 of the seat end cover 50 is rotated about the thin hinge portion 53 in a direction in which it is overlapped on the attachment flange portion 51 (a direction depicted by the arrow C in FIG. 12).

Subsequently, the cover body 52 is positioned so as to be overlapped (follow) the bottom surface portion 21 of the seat cushion 5 (a first position), and the hook-and-loop fastener 52f of the front surface 52a of the cover body 52 adheres to an epidermis material (not shown) which covers the bottom surface portion 21.

Accordingly, as shown in FIGS. 2 to 5, the latch cover 30 may be exposed, and the striker 24 provided in the rear wheel housing 83 may be inserted from the groove hole 31 of the latch cover 30.

Then, when the striker 24 and the latch 22 engage with each other, the seat cushion 5 may be fixed to the rear wheel housing 83, and the seat cushion 5 may be maintained in the seating posture.

At this time, since the latch 22 is covered with the latch cover 30, the passenger may be prevented from contacting the latch 22.

In the seating posture, since both ends of the seat cushion 5 in the vehicle width direction are placed on the rear wheel housing 83, the seat width of the seat cushion 5 may be large compared to the case where the seat cushion is disposed between the left and right rear wheel housings 83.

In other words, the second rear seat 4 with a large seat width may be mounted in even a vehicle with a small vehicle width.

Moreover, since a space is formed between the seat cushion 5 and the rear floor lining 91, the usability improves.

In addition, the latch 22 is disposed inside the recess portion 20 which is formed in the rear surface of the end of the seat cushion 5 in the left-right direction.

For this reason, the seating surface of the seat cushion 5 may be low compared to the case where the recess portion 20 is not provided and the latch 22 is disposed in the rear surface of the seat cushion 5, thereby setting the seating surface to an appropriate height at which the seating surface may be used satisfactorily.

Furthermore, since the cover body 52 of the seat end cover 50 is fixed to the bottom surface portion 21 of the seat cushion 5 by the hook-and-loop fastener 52f, when the second rear seat 4 is in the seating posture, the cover body 52 may be stabilized without the rattling of the cover body 52.

On the other hand, when the second rear seat 4 is folded and accommodated in the accommodation recess portion 92a, the left and right seat back portions 6L and 6R are inclined forward so as to be folded while being overlapped on the seat cushion 5.

Subsequently, the latch 22 is separated from the striker 24, and the folded second rear seat 4 is rotated backward about the shaft 16 serving as the rotation center so as to resist the elasticity of the spring 18 of the support device 14 so as to be accommodated in the accommodation recess portion 92a.

At this time, when a lock mechanism (not shown) is locked, the second rear seat 4 is maintained in the accommodating posture as shown in FIG. 8.

The lock mechanism may be locked and unlocked by operating a strap 23 (see FIGS. 3 and 8 to 11) which is attached to the rear floor end cross member 84.

When the second rear seat 4 is folded and accommodated in the accommodation recess portion 92a in this way, the bottom surface portion 21 of the seat cushion 5 is flush with the rear floor lining 91, so that the bottom surface portion 21 becomes a part of the floor surface.

Next, the hook-and-loop fastener 52f of the cover body 52 of the seat end cover 50 is peeled from the bottom surface portion 21 of the seat cushion 5.

Then, the cover body 52 is rotated upward about the thin hinge portion 53 and is rotated outward in the vehicle width direction, so that the front surface 52a of the cover body 52 and the bottom surface portion 21 of the seat cushion 5 are flush with each other.

Accordingly, as shown in FIGS. 9 and 11, the ends of the rear surface 52b of the cover body 52 in the left-right direction are placed on the flange portion 95a of the rear inner panel lining 95.

At this time, the casing 61 adheres to an iron plate 25 which is fixed to the flange portion 95a by the magnetic force of the magnet 62 of the coupling device 60 attached to the rear surface 52b of the cover body 52.

Here, the force of maintaining the cover body 52 in an opened state by the magnetic adhering force of the magnet 62 is larger than the force of biasing the cover body 52 toward the blocking direction by the spring 38.

For this reason, the cover body 52 is maintained in a posture of blocking the recess portion 20 of the seat cushion 5.

In this embodiment, the coupling device 60 and the iron plate 25 of the rear inner panel lining 95 constitute a coupling member.

As described above, in the coupling device 60, the casing 61 is freely movable in the up-down direction by a stroke in which the elastic member 63 is elastically compressible.

For this reason, even when the cover body 52 vibrates up and down with respect to the flange portion 95a of the rear inner panel lining 95 in a traveling mode, the vibration may be absorbed by the elastic deformation of the elastic member 63, and the casing 61 of the coupling device 60 may be suppressed from being separated from the iron plate 25 of the rear inner panel lining 95.

Accordingly, the casing 61 may be suppressed from being separated from the iron plate 25 due to the vibration and the rattling sound generated when the casing 61 lands on the iron plate 25 may be suppressed.

When the second rear seat 4 is adjusted to the accommodating posture so as to be accommodated in the accommodation recess portion 92a in this way, if the cover body 52 is positioned above the recess portion 20 of the rear surface of the seat cushion 5 (in other words, above the latch 22) (a second position), almost the entire upper area of the recess portion 20 may be covered with the cover body 52.

As a result, it is possible to prevent anything which is placed on the floor from dropping into the recess portion 20.

Also, the latch 22 disposed inside the recess portion 20 and the latch cover 30 may be covered with the cover body 52.

Accordingly, it is possible to prevent anything placed on the floor from dropping into the latch cover 30 and a foreign matter from intruding into the latch 22.

Since the seat end cover 50 which includes the cover body 52 is supported by the rear surface of the seat cushion 5 and is integrally formed with the seat cushion 5, the cover body 52 may not be lost.

Additionally, since the seat end cover 50 is attached to the rear surface of the seat cushion 5, the cover body 52 does not disturb the seating operation when the second rear seat 4 is adjusted to the seating posture.

When the second rear seat 4 which is accommodated in the accommodation recess portion 92a is returned to the seating posture, the lock mechanism is unlocked by operating the strap 23.

Then, the second rear seat 4 is slightly lifted while being maintained in the folded state due to the elasticity of the spring 18 of the support device 14.

Accordingly, the casing 61 of the coupling device 60 which adheres to the iron plate 25 by the magnetic force of the magnet 62 of the coupling device 60 separates from the iron plate 25, and the cover body 52 rotates in the blocking direction by the elasticity of the spring 38.

Subsequently, the cover body 52 rotates in the blocking direction, and the hook-and-loop fastener 52f adheres to the bottom surface portion 21 of the seat cushion 5.

Furthermore, the foldable type second rear seat 4 rotates forward about the shaft 16 of the support device 14, and the seat cushion 5 rotates to the position of the seating posture.

Then, when the striker 24 and the latch 22 engage with each other and the seat back 6 is inclined backward about the shaft 8, the second rear seat 4 is adjusted to the seating posture.

Other Embodiments

Furthermore, the invention is not limited to the above-described embodiment.

For example, the support unit which allows the seat adjusted to the accommodating posture from the seating position to be movable in the accommodation recess portion is not limited to the configuration of the above-described embodiment.

In the above-described embodiment, although an application is described in which the invention is applied to the second rear seat of the vehicle with three rows of seats, the invention is not limited to the seat of the vehicle with three rows of seats, and may be applied to a rear seat of a vehicle with two rows of seats.

The holding member which holds the cover member at the first position is not limited to the hook-and-loop fastener, but may be other members such as a hook.

The coupling member which couples the cover member and the vehicle body to each other when the cover member is at the second position is not limited to the coupling device using the magnetic adhering force, but may be other members such as a spring attached hook.

Industrial Applicability

According to the vehicle seat accommodating device of the invention, an accommodation type seat with a large seat width may be mounted in a vehicle with a small vehicle width.

Moreover, since a space with a predetermined height may be formed between the seat cushion being in the seating posture and the floor, the usability improves.

What is claimed is:

1. A vehicle seat accommodating device comprising:
a seat configured to include a seat cushion and a seat back supported so as to be tiltable with respect to the seat cushion;
an accommodation recess portion formed on a floor located behind the seat; and
a support unit movably supporting the seat so as to accommodate the seat in the accommodation recess portion in a state where the seat back is folded so as to be overlapped on the seat cushion, wherein
when the seat is adjusted to a seating posture, both ends of the seat cushion in a vehicle width direction are mounted on wheel housings that are bloated from side walls of a vehicle body toward the inside in the vehicle width direction.

2. The vehicle seat accommodating device according to claim 1, further comprising:
a striker provided on the wheel housings; and
a lock member which is engageable with the striker and removable from the striker at a rear surface of both ends of the seat cushion in the vehicle width direction.

3. The vehicle seat accommodating device according to claim 2, wherein
the lock member is provided in a recess portion which is formed on the rear surface of the seat cushion.

4. The vehicle seat accommodating device according to claim 2, further comprising:
a cover member covering an upper position of the lock member when the seat cushion is adjusted to an accommodating posture.

5. The vehicle seat accommodating device according to claim 4, wherein
the cover member is supported by the rear surface of the seat cushion so as to be rotatable between a first position and a second position, the lock member is exposed at the first position, the first position is disposed along the rear surface of the seat cushion, and the lock member is covered with the cover member at the second position.

6. The vehicle seat accommodating device according to claim 5, further comprising:
a holding member provided between the rear surface of the seat cushion and the cover member, holding the cover member at the first position.

7. The vehicle seat accommodating device according to claim 5, further comprising:
a coupling member coupling the cover member with the vehicle body when the cover member is located at the second position, the coupling member being provided between the cover member and the vehicle body.

8. The vehicle seat accommodating device according to claim 7, wherein
the coupling member couples the cover member with the vehicle body so as to allow the cover member and the vehicle body to be freely movable in a vertical direction relative to each other.

9. The vehicle seat accommodating device according to claim 4, wherein
the lock member is formed in a recess portion which is provided at the rear surface of the seat cushion, and the cover member covers upper positions of the lock member and the recess portion when the seat cushion is adjusted to the accommodating posture.

10. The vehicle seat accommodating device according to claim 5, wherein
the lock member is formed in a recess portion which is provided at the rear surface of the seat cushion, and the cover member covers upper positions of the lock member and the recess portion when the seat cushion is adjusted to the accommodating posture.

11. The vehicle seat accommodating device according to claim 6, wherein
the lock member is formed in a recess portion which is provided at the rear surface of the seat cushion, and the cover member covers upper positions of the lock member and the recess portion when the seat cushion is adjusted to the accommodating posture.

12. The vehicle seat accommodating device according to claim 7, wherein
the lock member is formed in a recess portion which is provided at the rear surface of the seat cushion, and the cover member covers upper positions of the lock member and the recess portion when the seat cushion is adjusted to the accommodating posture.

13. The vehicle seat accommodating device according to claim 8, wherein the lock member is formed in a recess portion which is provided at the rear surface of the seat cushion, and the cover member covers upper positions of the lock member and the recess portion when the seat cushion is adjusted to the accommodating posture.

14. The vehicle seat accommodating device according to claim 1, wherein
the seat cushion has a rear surface and a seating surface,
a length between the wheel housings close to the floor in the vehicle width direction is the shortest in lengths between the wheel housings therein,
a width of the seating surface is longer than the shortest length between the wheel housings, and
a width of the rear surface is shorter than the width of the seating surface.

15. The vehicle seat accommodating device according to claim 14, wherein
the rear surface is located along the wheel housings.

16. The vehicle seat accommodating device according to claim 14, further comprising:
a lock member provided under a side portion located outside the rear surface of the seat cushion.

17. The vehicle seat accommodating device according to claim 15, further comprising:
a lock member provided under a side portion located outside the rear surface of the seat cushion.

18. A vehicle seat accommodating device comprising:
a seat configured to include a seat cushion and a seat back supported so as to be tiltable with respect to the seat cushion, the seat cushion having ends, both ends of the seat cushion in a vehicle width direction when the seat is adjusted to a seating posture being formed and bloated so as to be directed upward and being mounted on wheel housings that are bloated from side walls of a vehicle body toward the inside in the vehicle width direction;
an accommodation recess portion formed on a floor located behind the seat;
a support unit movably supporting the seat so as to accommodate the seat in the accommodation recess portion in a state where the seat back is folded so as to be overlapped on the seat cushion;
recess portions formed close to a rear surface of a bloated portion of both ends of the seat cushion in the vehicle width direction, and the recess portions being cut so as to correspond to configurations of the wheel housings;
a lock member fixing the seat cushion to the wheel housings and facing the wheel housings, the lock member being provided in the recess portion;
a wheel-housing recess formed at a position of the wheel housings corresponding to the lock member, the wheel-housing recess being formed so that a width thereof decreases at a front side in a front-rear direction of the vehicle body and the width increases at a rear side in the front-rear direction of the vehicle body; and
a striker engageable with the lock member provided at the rear side of the wheel-housing recess in the front-rear direction of the vehicle body.

19. A vehicle seat comprising:
a seat configured to include a seat cushion and a seat back supported so as to be tiltable with respect to the seat cushion, the seat cushion having ends, both ends of the seat cushion in a vehicle width direction when the seat is adjusted to a seating posture being mounted on wheel housings that are bloated from the side walls of a vehicle body toward the inside in the vehicle width direction;
a support unit supporting the seat movably between the seating posture and an accommodating posture at which a rear surface of the seat cushion is directed upward;
a lock member fixing the seat cushion located in the seating posture to the wheel housings, the lock member being provided close to the rear surface of the seat cushion;
a cover member covering an upper side of the lock member when the seat cushion is located in the accommodating posture, the cover member being supported by the rear surface of the seat cushion so as to be rotatable between a first position and a second position, the lock member being exposed at the first position, the first position being disposed along the rear surface of the seat cushion, the lock member being covered with the cover member at the second position, the cover member being mounted on a horizontal plane provided on side walls of the vehicle body; and
a coupling member coupling the cover member with the vehicle body when the cover member is located at the second position, the coupling member being provided between the vehicle body and the cover member located behind the wheel housings.

* * * * *